(12) United States Patent
Chandramouli et al.

(10) Patent No.: US 12,369,203 B2
(45) Date of Patent: *Jul. 22, 2025

(54) NETWORK SELECTION WITH STATELESS NETWORK FUNCTIONS

(71) Applicant: NOKIA TECHNOLOGIES OY, Espoo (FI)

(72) Inventors: Devaki Chandramouli, Plano, TX (US); Alessio Casati, Surrey (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,853

(22) Filed: May 1, 2023

(65) Prior Publication Data
US 2023/0269793 A1  Aug. 24, 2023

Related U.S. Application Data

(63) Continuation of application No. 16/347,401, filed as application No. PCT/US2017/059938 on Nov. 3, 2017, now Pat. No. 11,678,387.
(Continued)

(51) Int. Cl.
*H04W 76/11* (2018.01)
*H04L 67/142* (2022.01)
(Continued)

(52) U.S. Cl.
CPC ........... *H04W 76/11* (2018.02); *H04L 67/142* (2013.01); *H04W 8/04* (2013.01); *H04W 80/10* (2013.01); *H04L 67/51* (2022.05); *H04W 84/042* (2013.01)

(58) Field of Classification Search
CPC ....... H04W 76/11; H04W 8/04; H04W 80/10; H04W 84/042; H04L 67/142; H04L 67/51
See application file for complete search history.

(56) References Cited

U.S. PATENT DOCUMENTS

2006/0025130 A1  2/2006 Krishnamurthi et al.
2011/0173330 A1  7/2011 Gong et al.
(Continued)

FOREIGN PATENT DOCUMENTS

KR        20160110476 A    9/2016
WO    WO 2015/106822 A1   7/2015

OTHER PUBLICATIONS

Final Office Action for U.S. Appl. No. 16/347,401 dated Apr. 29, 2021.
(Continued)

*Primary Examiner* — Jasper Kwoh
(74) *Attorney, Agent, or Firm* — ALSTON & BIRD LLP

(57) ABSTRACT

Various communication systems may implement network management tools to help manage registration requests from a user equipment. For example, network functions in a communication system with a shared data layer may be used to manage requests from the user equipment. A method may include transmitting a request from a user equipment to a network function. The method may also include receiving at the user equipment a temporary identification from the network function The temporary identification comprises an identifier that helps locate a shared data layer function that stores context information for the user equipment. In addition, the method may include transmitting from the user equipment a subsequent request comprising the temporary identification to another network function or the network function.

20 Claims, 4 Drawing Sheets

Related U.S. Application Data

(60) Provisional application No. 62/417,004, filed on Nov. 3, 2016.

(51) Int. Cl.
    *H04L 67/51*     (2022.01)
    *H04W 8/04*     (2009.01)
    *H04W 80/10*     (2009.01)
    *H04W 84/04*     (2009.01)

(56) References Cited

U.S. PATENT DOCUMENTS

| | | |
|---|---|---|
| 2014/0126448 A1 | 5/2014 | Punz et al. |
| 2014/0206314 A1 | 7/2014 | Abdallas et al. |
| 2016/0105825 A1 | 4/2016 | Hedberg et al. |
| 2016/0198329 A1 | 7/2016 | Lee et al. |
| 2017/0026301 A1 | 1/2017 | Keller et al. |
| 2017/0310755 A1 | 10/2017 | Hoernes et al. |
| 2018/0027521 A1 | 1/2018 | Kim et al. |
| 2018/0124175 A1 | 5/2018 | Li et al. |
| 2018/0317138 A1 | 11/2018 | Guo |
| 2019/0110323 A1 | 4/2019 | Wang et al. |
| 2019/0230158 A1 | 7/2019 | Massicot et al. |

OTHER PUBLICATIONS

3GPP TR 38.801 V0.6.0 (Oct. 2016), Technical Report, 3rd Generation Partnership Project; Technical Specification 3roup Radio Access Network; Study on New Radio Access Technology; Radio Access Architecture and Interfaces Release 14), 3GPP Draft; R3-162527_TR 38 801 V060, Nov. 1, 2016, XP051163420.

Drafting Editor (Nokia) et al., "Interim Agreements based on Way forward on Solutions for Key Issue 1 on Network Slicing," 3GPP Draft; S2-166097, SA WG2 Meeting #117, Oct. 17-21, 2016, Kaohsiung, Taiwan, Oct. 24, 2016, XP051170058.

Final Office Action for U.S. Appl. No. 16/347,401 dated Jun. 30, 2022.

International Search Report and Written Opinion dated May 28, 2018 corresponding to International Patent Application lo. PCT/US2017/059938.

May 16, 2019 International Preliminary Report on Patentability and Written Opinion issued in International Patent Application No. PCT/US2017/059938.

Nokia, "Reply to SM and MM decoupling: S2-165642," 3GPP Draft; S2-165911, 3GPP TSG SA WG2 Meeting #117, Oct. 17-21, 2016, Kaohsiung city, Taiwan, Oct. 24, 2016, XP051169894.

Non-Final Office Action for U.S. Appl. No. 16/347,401 dated Nov. 9, 2021.

Non-Final Office Action for U.S. Appl. No. 16/347,401 dated Oct. 5, 2020.

Notice of Allowance for U.S. Appl. No. 16/347,401 dated Feb. 1, 2023.

Office Action for European Application No. 17866362.1 dated Aug. 27, 2021, 14 pages.

Office Action for European Application No. 17866362.1 dated Mar. 31, 2020.

Office Action for European Application No. 17866362.1 dated May 15, 2023, 9 pages.

Office Action for Indian Application No. 201947017576 dated Nov. 23, 2020.

Samsung, "Update on solution 1.2: Extending the Slice Type components of an MDD vector," 3GPP Draft; 32-165853, SA WG2 Meeting #117, Oct. 17-21, 2016, Kaohsiung City, Taiwan, Oct. 16, 2016, XP051155434.

Nokia et al., "TS 23.501: Way forward and Solution for change of AMF / Control of N2 persistence", SA WG2 Temporary Document, SA WG2 Meeting #121, S2-173989, (May 15-19, 2017), 6 pages.

Samsung, "Stateless AMF", SA WG2 Temporary Document, SA WG2 Meeting #118-BIS, S2-170330, (Jan. 16-20, 2017), 3 pages.

Samsung, "Update of solution 1.2 to efficiently support multiple 3rd parties", SA WG2 Temporary Document, SA WG2 Meeting #116BIS, S2-164662, (Aug. 29-Sep. 2, 2016), 13 pages.

NETWORK SELECTION WITH STATELESS NETWORK FUNCTIONS

CROSS-REFERENCE TO RELATED APPLICATIONS

This application is a continuation of U.S. Non-Provisional patent application Ser. No. 16/347,401, filed May 3, 2019 and entitled "Network Selection with Stateless Network Functions," which is a National Stage Entry of International Patent Application Serial No. PCT/US2017/059938, filed Nov. 3, 2017 and entitled "Network Selection with Stateless Network Functions," which claims the benefit of priority to U.S. Provisional Application Ser. No. 62/417,004, filed Nov. 3, 2016, the entire contents of each of which are hereby incorporated herein by reference in their entireties for all purposes.

FIELD

Various communication systems may implement network management tools to help manage registration requests from a user equipment. For example, network functions in a communication system with a shared data layer may be used to manage requests from the user equipment.

BACKGROUND

Third generation partnership project (3GPP) 5th generation (5G) technology is a next generation of radio systems and network architecture that can deliver extreme broadband and ultra-robust, low latency connectivity. 5G technology improves a variety of telecommunication services offered to the end users, and helps to support massive broadband that delivers gigabytes of bandwidth per second on demand for both the uplink and downlink transmissions. 5G also allows for machine-type communication (MTC) with extremely low end-to-end (E2E) latency. MTC communication involves immediate synchronous eye-hand feedback that is used for controlling devices, such as remote control of robots, cars, and any other device that can be helped by low E2E latency. Massive MTC (mMTC), in which billions of sensors and machines are connected to one another, may also be aided by 5G technology.

Given the large number of diverse use cases provided for by 5G technology, 5G architecture expands beyond previous architectures of 4th generation (4G), Long Term Evolution (LTE), or any other wireless mobile telecommunications technology. 5G is not only a new Radio Access Technology (RAT) family, but also provides a common core for multiple radio technologies, such as cellular networks, wireless land access networks, and fixed networks. In addition, 5G provides a common core for multiple services, such as Internet of Things (IoT), mobile broadband, low latency-high reliability, and multiple network and service operators.

Next generation systems, which utilize the 5G architecture, utilize virtualized radio access network (RAN) functions and core network functions. Unlike previous technologies, instead of having individual entities in the network perform various functions and manage their own data, virtualized functions can run on top of a shared data center. The data center may therefore be a shared data layer that provides a central storage location for all virtualized network functions. This virtualization infrastructure can be leveraged to decouple the compute functions of the network and the storage layer of the network.

SUMMARY

According to certain embodiments, a method may include transmitting a request from a user equipment to a network function. The method may also include receiving at the user equipment a temporary identification from the network function. The temporary identification comprises an identifier that helps locate a shared data layer function that stores context information for the user equipment. In addition, the method may include transmitting from the user equipment a subsequent request comprising the temporary identification to another network function or the network function.

In a variant, the network function may be located in a serving public mobile network.

In a variant, the method may also include deriving the serving public land mobility network of the user equipment using an identity of the public land mobility network.

In another variant, the method may further include transmitting the temporary identification to a radio access network.

In yet another variant, the temporary identification may be transmitted to the radio access network via a radio resource control message.

According to another embodiment, a method may include receiving at a network function a request from a user equipment. The method may also include generating a temporary identification for the user equipment. The temporary identification comprises an identifier that helps locate a shared data layer function that stores context information for the user equipment. In addition, the method may include assigning the temporary identification to the user equipment.

In a variant, the method may additionally include sending the temporary identification to the user equipment.

In another variant, the method may also include receiving at the network function or at another network function a subsequent request comprising the temporary identification from a user equipment.

In yet another variant, the method may also include retrieving at the network function or at the another network function context information for the user equipment from the shared data layer function using the temporary identification.

In a variant, the method can further include responding to the request from the user equipment using the retrieved context information.

In yet another variant, the network function may be located in a serving public land mobile network.

In a variant, the shared data layer may be located in a public land mobile network.

In another variant, an identity of the serving public land mobile network may be pre-configured in the network function.

In an additional variant, the network function may be pre-configured with an IP address of the data layer.

In a further variant, the network function may be pre-configured with the IP address of the data layer during deployment or instantiation of the network function.

In another variant, the network function used for uplink communications may be selected by a radio access network.

In yet another variant, the network function used for downlink communication may be elected by a session management function.

In a further variant, the method may include storing the user equipment context information in the data layer, and releasing the user equipment context information from the network function.

In a variant, the network function may provide for at least one of mobility management, session management, or policy control.

According to certain embodiments, an apparatus may include at least one memory including computer program code, and at least one processor. The at least one memory and the computer program code may be configured, with the at least one processor, to cause the apparatus at least to transmit a request to a network function. The at least one memory and the computer program code may also be configured, with the at least one processor, to cause the apparatus at least to receive a temporary identification from the network function. The temporary identification may comprise an identifier that helps locate a shared data layer function that stores context information for the apparatus. In addition, the at least one memory and the computer program code may be configured, with the at least one processor, to cause the apparatus at least to transmit a subsequent request comprising the temporary identification to another network function or to the network function.

An apparatus, in certain embodiments, may include means for include transmitting a request from a user equipment to a network function. The apparatus may also include means for receiving at the user equipment a temporary identification from the network function. The temporary identification may comprise an identifier that helps locate a shared data layer function that stores context information for the user equipment. In addition, the apparatus may include means for transmitting from the user equipment a subsequent request comprising the temporary identification to another network function or to the network function.

According to certain embodiments, a non-transitory computer-readable medium encoding instructions that, when executed in hardware, perform a process. The process may include transmitting a request from a user equipment to a network function. The process may also include receiving at the user equipment a temporary identification from the network function. The temporary identification may comprise an identifier that helps locate a shared data layer function that stores context information for the user equipment. In addition, the process may include transmitting from the user equipment a subsequent request comprising the temporary identification to another network function or to the network function.

According to certain other embodiments, a computer program product may encode instructions for performing a process. The process may include transmitting a request from a user equipment to a network function. The process may also include receiving at the user equipment a temporary identification from the network function. The temporary identification may comprise an identifier that helps locate a shared data layer function that stores context information for the user equipment. In addition, the process may include transmitting from the user equipment a subsequent request comprising the temporary identification to another network function or to the network function.

According to certain embodiments, an apparatus may include at least one memory including computer program code, and at least one processor. The at least one memory and the computer program code may be configured, with the at least one processor, to cause the apparatus at least to receive a request from a user equipment. The at least one memory and the computer program code may also be configured, with the at least one processor, to cause the apparatus at least to generate a temporary identification for the user equipment. The temporary identification may comprise an identifier that helps locate a shared data layer function that stores context information for the user equipment. In addition, the at least one memory and the computer program code may also be configured, with the at least one processor, to cause the apparatus at least to assign the temporary identification to the user equipment.

An apparatus, in certain embodiments, may include means for receiving at a network function a request from a user equipment. The apparatus may also include means for generating a temporary identification for the user equipment. The temporary identification may comprise an identifier that helps locate a shared data layer function that stores context information for the user equipment. In addition, the apparatus may include means for assigning the temporary identification to the user equipment.

According to certain embodiments, a non-transitory computer-readable medium encoding instructions that, when executed in hardware, perform a process. The process may include receiving at a network function a request from a user equipment. The process may also include generating a temporary identification for the user equipment. The temporary identification may comprise an identifier that helps locate a shared data layer function that stores context information for the user equipment. In addition, the process may include assigning the temporary identification to the user equipment.

According to certain other embodiments, a computer program product may encode instructions for performing a process. The process may include receiving at a network function a request from a user equipment. The process may also include generating a temporary identification for the user equipment. The temporary identification may comprise an identifier that helps locate a shared data layer function that stores context information for the user equipment. In addition, the process may include assigning the temporary identification to the user equipment.

BRIEF SUMMARY OF DRAWINGS

For proper understanding of the invention, reference should be made to the accompanying drawings, wherein.

DETAILED DESCRIPTION

Figure 1:
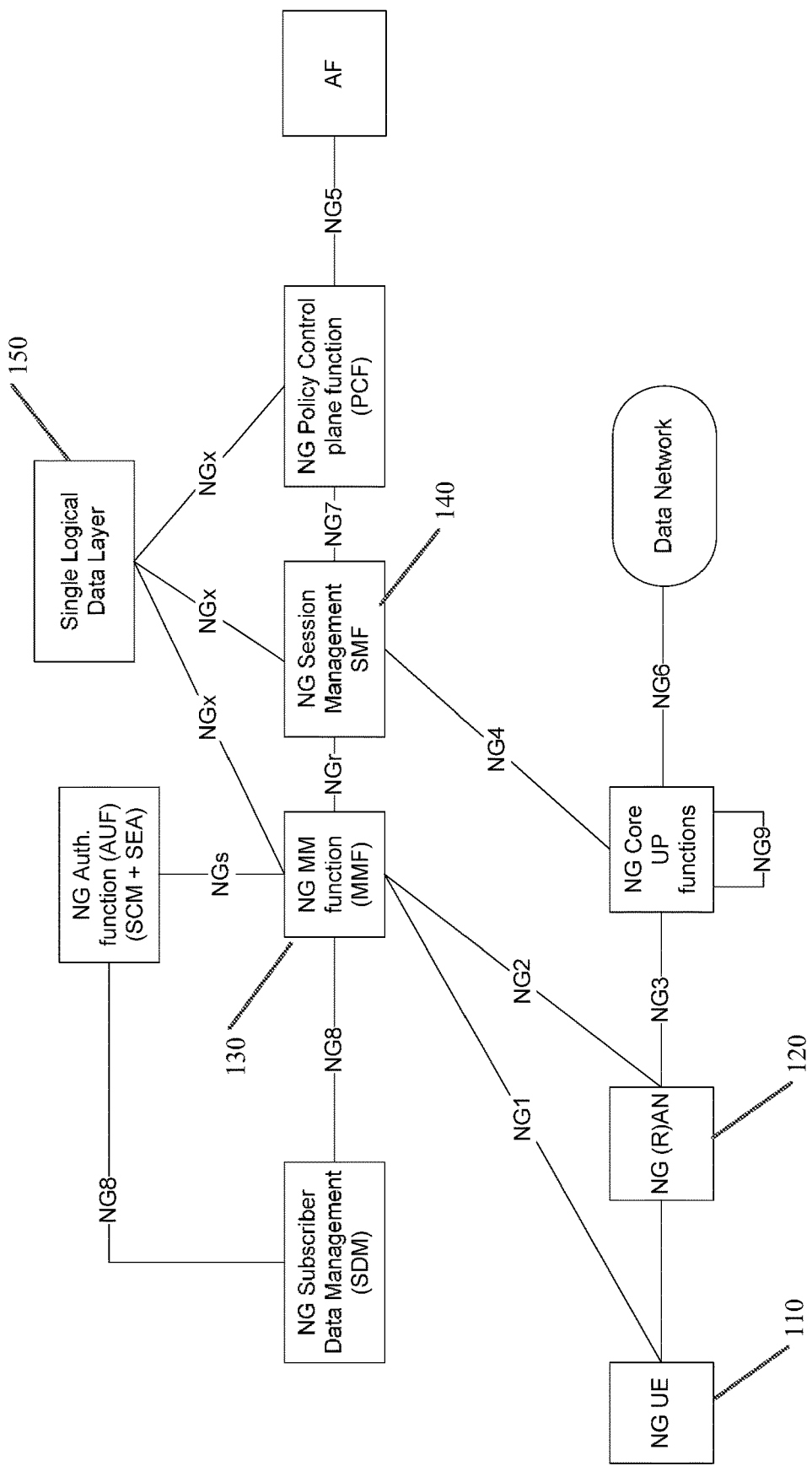
FIG. 1 illustrates a 5G network architecture.

Certain embodiments provide support for stateless network functions. Stateless network functions, also referred to as network function hereinafter, may be those virtualized network functions in a 5G network that do not manage their own data. Rather, the data of the virtualized network functions may be managed and stored at a shared data center. This shared data center may be located in a Shared Data Layer. The Shared Data Layer may be referred to as an Unstructured Data Storage Function (UDSF). The Shared Data Layer can be used to decrease the complexity of the network, and to easily scale or adjust the network to meet changing resource demands.

In order for a user equipment (UE) to properly connect to a network, UE context information may be utilized. The UE may be, for example, a mobile device or a machine, such as a sensor or a meter. The context information may be used at least to establish a connection between the UE and the network, such as a radio resource control (RRC) connection. In certain embodiments that utilize a stateless network function environment, it may be helpful to determine where the UE context is stored, and to identify how the context information should be retrieved by the stateless network functions.

In contrast to many of the embodiments described below, in an evolved packet system (EPS), the UE may send a temporary identity, such as a globally unique temporary identification (GUTI) or a serving temporary mobile subscriber identity (S-TMSI). The temporary identity may include the mobility management entity (MME) identifier. The identified MME is expected to have the context information for the UE stored therein. Even if a new MME is selected, the new MME can derive the old MME identification based on a received temporary identification, and retrieve the UE context information from the old MME.

In certain embodiments, however, the UE context information may be stored in the stateless network function. The embodiments below may provide for an apparatus, method, process, or computer program in which the stateless network function may be able to discover the shared data layer, also referred to as a UDSF, in which the UE context information is stored, and to retrieve the UE context information from the determined location. Certain embodiments may optimize the access to the data center, also referred to as a state repository, by the network functions. The embodiments identified below help to achieve significant improvements to the functioning of a network and/or to the functioning of the different network entities within the network.

In certain embodiments, all network functions may be able to process a request from the UE. In other embodiments, however, only some of the network functions may be able to process the request. The request, for example, may be a registration request, or may be a service request by the UE to utilize a service provided by any one of the network functions. A network function may be a mobility management function (MMF), a session management function (SMF), or a policy control plane function (PCF), for example. In some embodiments, the initial request may be a service request sent by the UE, for example, when the UE transitions from an Idle mode to a Connected mode. Subsequent requests may be packet data unit (PDU) session requests, for example.

FIG. 1 illustrates a 5G network architecture. In particular, FIG. 1 illustrates a next generation (NG) UE 110 being connected to a NG Radio Access Network (RAN) 120. The 5G architecture also including a single logical data layer 150, also known as a shared data layer. As discussed above, the shared data layer may be used as a central point of storage for all of the network functions in the network. NG MMF 130 and NG SMF 140 may also be provided in the network. Both MMF 130 and SMF 140 may be virtualized network functions connected to data layer 150.

In certain embodiments, MMF 130 and SMF 140 may be stateless, and may not individually store UE context information. Rather, the UE context information may be stored in shared data layer 150. Any one of the network functions, for example MMF 130 or SMF 140, may retrieve the UE context information from shared data layer 150. In addition, any of the network functions provided in the network, such as a session management function, a protocol control function, or a mobility management function, may be selected to process a request from the UE. In some embodiments, the mobility management function may be referred to as either MMF or AMF.

The shared data layer, in some embodiments, may be located in the public land mobile network (PLMN). Accordingly, the virtualized network functions may also be located in the local PLMN. In certain embodiments, the MMF may be located in the serving PLMN. The data layer may be discovered through an interaction with the domain name service function. For example, the MMF may interact with the domain name service function to determine the location of the data layer. The fully qualified domain name (FQDN) of a data layer function in the serving PLMN may in some embodiments be pre-configured in the respective network functions. Network function may be a processing entity, while data layer function may be a function that supports database functionality.

Alternatively, the serving PLMN may be self-constructed by the UE through a PLMN identification of the serving PLMN. The Internet Protocol (IP) address of a data layer function in a home PLMN may be provisioned in the UE. The network function may, in some embodiments, assign a data layer function for the UE based on an international mobile subscriber identity (IMSI) or an international mobile entity identity (IMEI) range.

In other embodiments, each network function that uses the data layer may be configured with at least one IP address of the data layer when it is instantiated or deployed. In other words, the network functions may be pre-configured with the IP address of the data layer. In some embodiments, the network function may be pre-configured with the internet protocol address of the data layer during deployment or instantiation of the network function. The stored UE context information in the data layer may be addressable by various UE identities. In certain embodiments, the identities may be assigned by a home PLMN (HPLMN) or a visited PLMN (VPLMN), and the identities may be either permanent or temporary. For example, one identity may be the IMSI, which may act as the primary key to the data at the UE. In other embodiments, however, other keys may be used, such as temporary identities associated with the UE in the RAN or the core network. Network functions may then use these preconfigured identities to retrieve the UE context information.

In certain embodiments, each network function may have knowledge of either the IMSI or one of the identities described above. The network functions may use the IMSI or the above identities to access the UE context information. In some embodiments, the network functions may have administrative authorization to access the UE context information. It may also be possible to discover the data layer in a network by means of either domain name system (DNS) queries or any other mechanism.

As discussed in the above embodiments, the network functions may access the data layer in order to retrieve UE context information. The data layer may be geographically redundant so that the network functions may have a primary address collocated in the same data center or in the same network entity. The data layer may be a logical function that can be located in the same data center as the network function. The network functions, which may be a virtualized network functions, can then be run on top of the data center. While the primary logical function that stores context may be collocated in the same data center, the secondary logical function that stores context may be located in other data centers.

Figure 2:
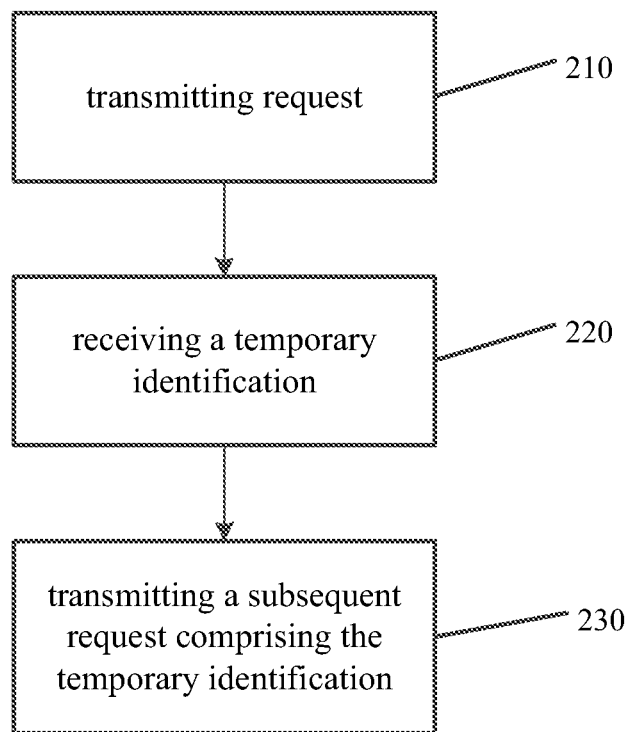
FIG. 2 illustrates a flow diagram according to certain embodiments.

FIG. 2 illustrates a flow diagram according to certain embodiments. In particular, FIG. 2 illustrates an embodiment of a UE, or a process or method carried out by the UE. In step 210, the UE may transmit an initial registration request towards the network. Any network function may then be selected by the network to process the request. Upon receiving the request, the network function, such as an MMF, may generate a temporary identification for the UE. The temporary identification may include an identifier that maps to a location in the shared data layer in which the UE context information is stored, also referred to as an unstructured data storage function. For example, the identifier may uniquely map to a data layer state repository assigned for storing the UE context information. The generated temporary identification may then be assigned to the UE, which may include sending the temporary identification to the UE.

In another embodiment, the temporary identification may include an identifier that maps to the network function that processed the UE request. In other words, the temporary identification may include an identifier of the network function that has a UE association. For example, the identifier may uniquely map to both the network function and the data layer state repository assigned for storing the UE context information. The generated temporary identification may then be assigned to the UE, which may include sending the temporary identification to the UE.

As shown in step 220, the UE receives the assigned temporary identification from the network function. When transmitting subsequent requests to another network function or to the network function, the UE may include the temporary identification within the request, as shown in step 230. The selected network function, which is the another network function or the network function receiving the subsequent request, may then use the temporary identification included in the subsequent UE request to retrieve the UE context information from the stored located in the data layer. While in some embodiments the temporary identification may be the only information the network function uses to retrieve the UE context information, in other embodiments the temporary identification may be used in conjuncture with other information to retrieve the stored UE context information.

Figure 3:
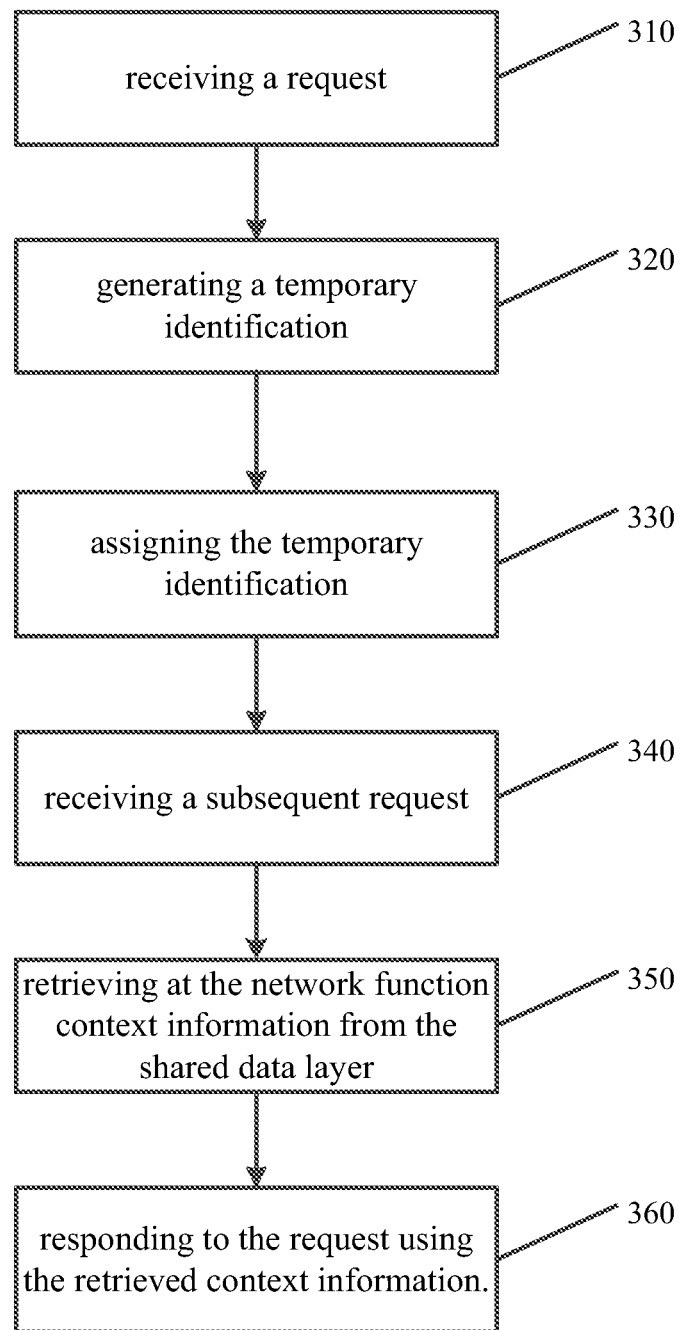
FIG. 3 illustrates a flow diagram according to certain embodiments.

FIG. 3 illustrates a flow diagram according to certain embodiments. In particular, FIG. 3 illustrates a flow diagram from the perspective of one or more network functions operating on a network entity. The network entity may be the server or a data center upon which the virtualized network functions operate. The network entity operating the one or more network functions can communicate with the user equipment shown in FIG. 2. In step 310, any of the network functions in the network may receive a registration request. The network function may then generate a temporary identification, and assign and/or transmit the temporary identification to the UE, as shown in steps 320 and 330. The temporary identification may include an identifier that helps locate a shared data layer function, for example, a state repository of the data layer, which stores the UE context information. The shared data layer function may be referred to as an unstructured data storage function. Upon completion of the processing of the registration request, the network function may store UE context information in the data layer, and release the UE context information. In other words, the network function may purge the context information once the registration request is processed.

In certain embodiments, the network function may receive a subsequent request from the UE, as shown in step 340. The request may include the temporary identification that was previously assigned to the UE. The request may be received by either the same network function that generated and assigned the temporary identification, or by any other network function, referred to as another network function. In step 350, the network function may use the temporary identification received in step 340 to retrieve UE context information from the shared data layer function or unstructured data storage function using the temporary identification. For example, the network function may query the data layer to retrieve the UE context, by using a DNS query, for example. In step 360, the network function may use the retrieved context information to process the request received from the UE. For example, the retrieved context information may be used for registration or to attach a request. The retrieved content information may also be used to track an area update requests, or to provide a requested service.

To support storage of RAN contexts in the shared data layer or the unstructured data storage function, the temporary identification may be provided to the RAN by the UE. The temporary identification may then be used by the RAN to page and select a network function, such as a MMF. In certain embodiments, the temporary identification, or a derived version of the temporary identification, may be transmitted from the UE to the RAN. The UE may in some embodiment transmit the temporary identity, or the derived identity, to the RAN via an RRC message. The RAN can use the temporary identification to determine the correct data layer function where the UE context may be stored. The temporary identification may also be used for core network selection.

In certain embodiments, a stateless network function, for example an MMF, may be selected by an independent function. In some network communication systems, downlink and uplink communications may occur even when the UE may be in idle mode. In such embodiments, the MMF or the MMF pool for uplink communications may be selected by the RAN, while the MMF for downlink communication may be selected by the SMF. In other embodiments the MMF, or any other network function involved in uplink or downlink communication, may be selected by any other network function or RAN. The data layer, in some embodiments, may guarantee synchronization of the UE context information by allowing access in mutual exclusion. An MMF pool may include one or more mobility management functions.

For example, access to UE context information by distributed data layer functions may be realized by setting a MUTEX flag in a centralized location for the UE. MUTEX may be a synchronization mechanism for enforcing limits on access to a resource in an environment where there are many threads of execution. The MUTEX function may house the primary key for the UE, as well as a flag indicating that the context may be locked. The hardware supporting the MUTEX function may be very reliable. In some embodiments, there may be multiple MUTEX functions each devoted to a range of the primary key values. Multiple MUTEX functions can increase the reliability and availability of the network.

There may be various processes used for selecting an MMF for a UE. In some embodiments, RAN or SMF may address an MMF at random. Either the RAN or SMF may attempt to claim to be the MMF for the UE, and register in the UE context in a MUTEX function. The first network function to claim to be the MMF for the UE may write its address in the UE context information. When a network function receives the context information at a later point in time, the network function may check whether there is already an MMF that has claimed the UE. The SMF may then be redirected to MMF that has already claimed the UE. In the above embodiments, the RAN and the SMF may have access to the data layer, and the last MMF may clear its address from that data layer when the MMF may no longer be in use.

Figure 4:
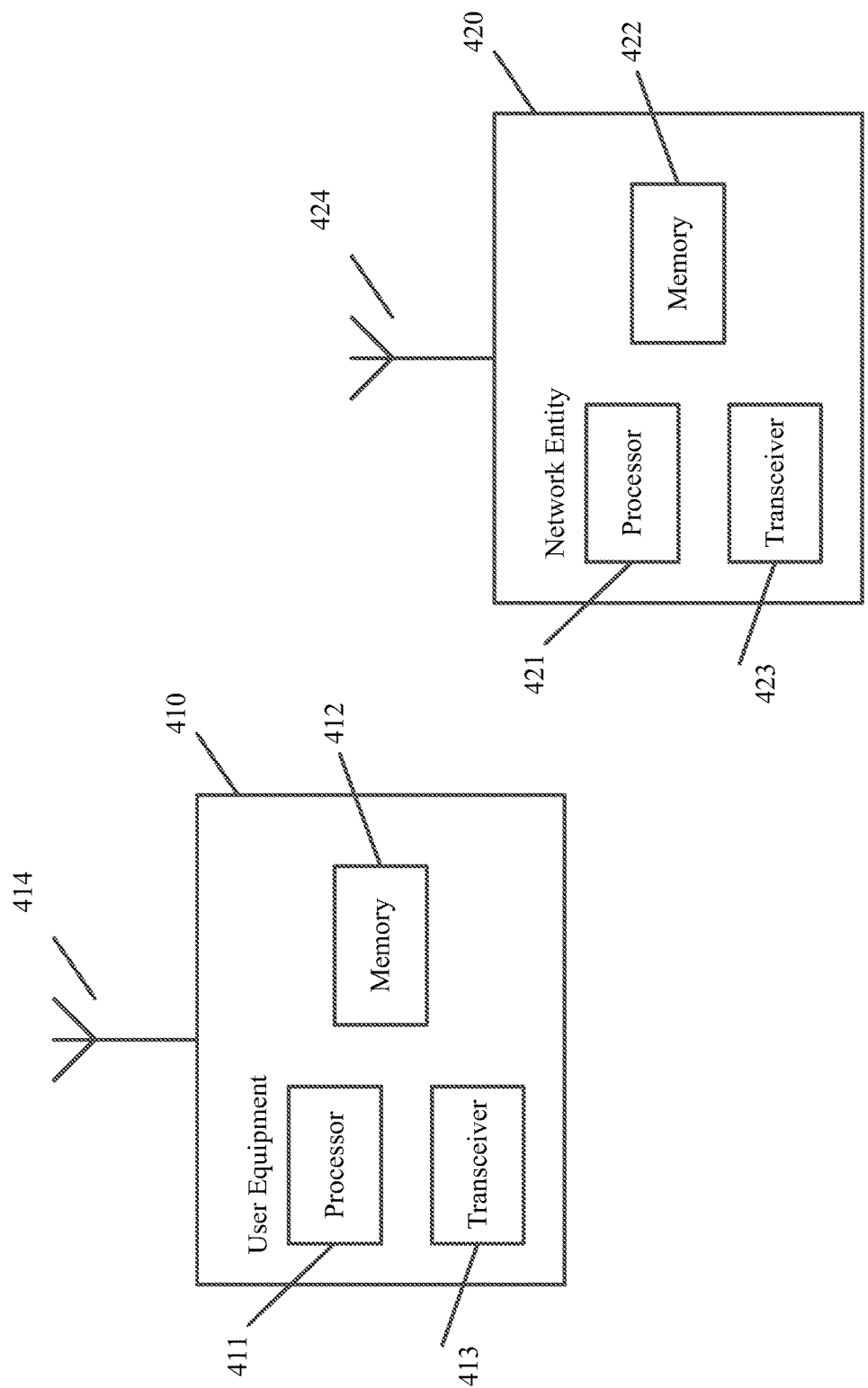
FIG. 4 illustrates a system according to certain embodiments.

FIG. 4 illustrates a system according to certain embodiments. It should be understood that each signal or block in FIGS. 1, 2, and 3 may be implemented by various means or their combinations, such as hardware, software, firmware, one or more processors and/or circuitry. In one embodiment, a system may include several devices, such as, for example, network entity 420 or UE 410. The system may include more than one UE 410 and more one network node 420. The network entity may be a data center, a network node, a SGNB, a NG NB, a server, host, or any of the other access or network node. Any one of the network functions may be running on top of the network entity.

Each of these devices may include at least one processor or control unit or module, respectively indicated as 411 and 421. At least one memory may be provided in each device, and indicated as 412 and 422, respectively. The memory may include computer program instructions or computer code contained therein. One or more transceiver 413 and 423 may be provided, and each device may also include an antenna, respectively illustrated as 414 and 424. Although only one antenna each is shown, many antennas and multiple antenna elements may be provided to each of the devices. Other configurations of these devices, for example, may be provided. For example, network entity 420 and UE 410 may be additionally configured for wired communication, in addition to wireless communication, and in such a case antennas 414 and 424 may illustrate any form of communication hardware, without being limited to merely an antenna.

Transceivers 413 and 423 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner In other words, division of labor may vary case by case. One possible use is to make a network node deliver local content. One or more functionalities may also be implemented as virtual application(s) in software that can run on a server.

A user device or user equipment 410 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor or a meter.

In some embodiments, an apparatus, such as a network entity, may include means for carrying out embodiments described above in relation to FIGS. 2 and 3. In certain embodiments, at least one memory including computer program code can be configured to, with the at least one processor, cause the apparatus at least to perform any of the processes described herein.

Processors 411 and 421 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 412 and 422 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 420 or UE 410, to perform any of the processes described above (see, for example, FIGS. 1, 2, and 3). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments may be performed entirely in hardware.

Furthermore, although FIG. 4 illustrates a system including a network entity 420 and UE 410, certain embodiments may be applicable to other configurations, and configurations involving additional elements, as illustrated and discussed herein. For example, multiple user equipment devices and multiple network entities may be present, or other nodes providing similar functionality, such as nodes that combine the functionality of a user equipment and an network entity, such as a relay node. The UE 410 may likewise be provided with a variety of configurations for communication other than communication network entity 420. For example, the UE 410 may be configured for device-to-device, machine-to-machine, or vehicle-to-vehicle communication.

Certain embodiments can provide a method, apparatus, means for, or a computer product for data layer discovery. In particular, the above embodiments provide for an efficient solution for the network function to find the data layer where the UE context information may be stored. Otherwise, the network function may have to use multiple queries to determine the UE context information, which can require a large overhead and a large amount of network resources. The optimized access to the data layer, as described in the above embodiments, therefore achieves significant improvements to the functioning of a network and/or to the functioning of the different network entities within the network.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

PARTIAL GLOSSARY

3GPP Third Generation Partnership Project
5G 5th Generation
DNS Doman Name System
DL Data Layer
SDL Shared data layer
IMEI International Mobile Equipment Identity
IMS IP Multimedia Subsystem
IMSI International Mobile Subscriber Identity
FQDN Fully Qualified Domain Name
NG Next Generation
MMF Mobility Management Function
PLMN Public Land Mobile Network
SMF Session Management Function
RAN Radio Access Network
RRC Radio Resource Control
MTC Machine-Type Communication
mMTC Massive MTC
UDSF Unstructured Data Storage Function
UE User Equipment

What is claimed is:

1. A user equipment comprising:
   at least one processor; and
   at least one memory comprising instructions stored thereon that, when executed by the at least one processor, cause the user equipment to perform at least:
     transmitting, to a mobility management function, a registration request;
     receiving, from the mobility management function, a temporary identification, wherein the temporary identification comprises an identifier that maps to a location in a shared data layer that stores context information for the user equipment; and
     transmitting, to the mobility management function or another mobility management function, a subsequent registration request comprising the temporary identification.

2. The user equipment of claim 1, wherein the mobility management function is located in a serving public mobile network.

3. The user equipment of claim 1, wherein the instructions stored on the at least one memory, when executed by the at least one processor, further cause the user equipment to perform:
   transmitting the temporary identification to a radio access network.

4. The user equipment of claim 3, wherein the transmitting the temporary identification to the radio access network comprises transmitting a radio resource control message comprising the temporary identification to the radio access network.

5. A network entity comprising:
   at least one processor; and
   at least one memory comprising instructions stored thereon that, when executed by the at least one processor, cause the network entity to perform at least:
     receiving, from a user equipment, a registration request;
     generating a temporary identification for the user equipment, wherein the temporary identification comprises an identifier that maps to a location of a shared data layer that stores context information for the user equipment; and
     assigning the temporary identification to the user equipment.

6. The network entity of claim 5, wherein the instructions stored on the at least one memory, when executed by the at least one processor, further cause the network entity to perform:
   sending the temporary identification to the user equipment.

7. The network entity of claim 5, wherein the instructions stored on the at least one memory, when executed by the at least one processor, further cause the network entity to perform:
   receiving, from the user equipment, a subsequent registration request comprising the temporary identification.

8. The network entity of claim 5, wherein the instructions stored on the at least one memory, when executed by the at least one processor, further cause the network entity to perform:
   retrieving context information for the user equipment from the shared data layer using the temporary identification.

9. The network entity of claim 8, wherein the instructions stored on the at least one memory, when executed by the at least one processor, further cause the network entity to perform:
   responding to the registration request received from the user equipment using the context information retrieved from the shared data layer using the temporary identification.

10. The network entity of claim 5, wherein the network entity is located in a serving public land mobile network.

11. The network entity of claim 5, wherein the shared data layer is located in a public land mobile network.

12. The network entity of claim 5, wherein an identity of the serving public land mobile network is pre-configured in the network entity.

13. The network entity of claim 5, wherein the network entity is pre-configured with an internet protocol address of the shared data layer.

14. The network entity of claim 13, wherein the network entity is pre-configured with the internet protocol address of the shared data layer during deployment or instantiation of the network entity.

15. The network entity of claim 5, wherein the network entity used for uplink communications is selected by a radio access network.

16. The network entity of claim 5, wherein the network entity used for downlink communication is selected by a session management function.

17. The network entity of claim 5, wherein the instructions stored on the at least one memory, when executed by the at least one processor, further cause the network entity to perform:
   storing the user equipment context information in the shared data layer; and
   releasing the user equipment context information from the network entity.

18. The network entity of claim 5, wherein the network entity stores instructions of at least one of: a session management function or a policy control function.

19. A method comprising:
   receiving, at a mobility management function, from a user equipment, a registration request;
   generating a temporary identification for the user equipment, wherein the temporary identification comprises an identifier that maps to a location of a shared data layer that stores context information for the user equipment; and
   assigning the temporary identification to the user equipment.

20. A method comprising:
   transmitting, from a user equipment, to a mobility management function, a registration request:
   receiving, at the user equipment, from the mobility management function, a temporary identification, wherein the temporary identification comprises an identifier that maps to a location of a shared data layer that stores context information for the user equipment; and
   transmitting, from the user equipment, to the mobility management function or another mobility management function, a subsequent registration request comprising the temporary identification.

* * * * *